US012654070B2

(12) United States Patent
Shindo

(10) Patent No.: US 12,654,070 B2
(45) Date of Patent: Jun. 16, 2026

(54) GOLF BALL

(71) Applicant: Bridgestone Sports Co., Ltd., Tokyo (JP)

(72) Inventor: Jun Shindo, Chichibushi (JP)

(73) Assignee: BRIDGESTONE SPORTS CO., LTD., Tokyo (JP)

( * ) Notice: Subject to any disclaimer, the term of this patent is extended or adjusted under 35 U.S.C. 154(b) by 110 days.

(21) Appl. No.: 18/509,824

(22) Filed: Nov. 15, 2023

(65) Prior Publication Data

US 2024/0181300 A1 Jun. 6, 2024

(30) Foreign Application Priority Data

Nov. 22, 2022 (JP) ................................ 2022-186778

(51) Int. Cl.

| | |
|---|---|
| ***A63B 37/06*** | (2006.01) |
| ***A63B 37/00*** | (2006.01) |
| ***C08K 5/09*** | (2006.01) |
| ***C08K 5/14*** | (2006.01) |
| ***C08K 5/378*** | (2006.01) |
| ***C08L 9/00*** | (2006.01) |

(52) U.S. Cl.

CPC ...... *A63B 37/0063* (2013.01); *A63B 37/0065* (2013.01); *C08K 5/09* (2013.01); *C08K 5/14* (2013.01); *C08K 5/378* (2013.01); *C08L 9/00* (2013.01)

(58) Field of Classification Search

CPC ........................ A63B 37/0063; A63B 37/0065

See application file for complete search history.

(56) References Cited

U.S. PATENT DOCUMENTS

| | | | | |
|---|---|---|---|---|
| 2015/0065268 | A1 | 3/2015 | Nakajima et al. | |
| 2016/0166887 | A1 | 6/2016 | Nakajima et al. | |
| 2017/0361170 | A1 | 12/2017 | Ohira et al. | |
| 2020/0001143 | A1 * | 1/2020 | Shindo | A63B 37/0063 |
| 2021/0355300 | A1 * | 11/2021 | Shindo | A63B 37/00621 |

FOREIGN PATENT DOCUMENTS

| | | | |
|---|---|---|---|
| JP | 2015-047502 | A | 3/2015 |
| JP | 2016-112159 | A | 6/2016 |
| JP | 2019-005549 | A | 1/2019 |

* cited by examiner

*Primary Examiner* — Raeann Gorden

(74) *Attorney, Agent, or Firm* — Sughrue Mion, PLLC

(57) ABSTRACT

In a golf ball having a core and a cover of one or more layer, the core is a product molded under heat from a rubber composition which includes (a) a base rubber, (b) a co-crosslinking agent which is an α,β-unsaturated carboxylic acid and/or a metal salt thereof, (c) an organic peroxide, and (d) water, wherein the content of component (d) is set within a specific range and components (b) and (c) are included in relative amounts that satisfy a specific condition. The core has a specific compressive deformation and a specific hardness difference between the center and surface thereof. Owing to the large hardness difference in the internal hardness profile of the core, the ball exhibits low spin characteristics when hit, improving the flight performance, yet retains a good durability to impact.

13 Claims, 2 Drawing Sheets

GOLF BALL

CROSS-REFERENCE TO RELATED APPLICATIONS

This non-provisional application claims priority under 35 U.S.C. § 119(a) on Patent Application No. 2022-186778 filed in Japan on Nov. 22, 2022, the entire contents of which are hereby incorporated by reference.

TECHNICAL FIELD

The present invention relates to a golf ball having a core of one or more layer and a cover of one or more layer.

BACKGROUND ART

In a number of recent disclosures in the art, the cross-sectional hardness of a golf ball core is adjusted to create a specific core hardness gradient, enabling the ball to achieve an increased distance on full shots with a driver or an iron club owing to optimization of the spin characteristics. Increasing the hardness difference between the surface and center of the core is known to have the effect of reducing the spin rate of the ball on full shots with a driver. Moreover, it is known from prior findings that reducing the spin rate on full shots leads to an enhanced distance. One way to increase the hardness difference between the surface and center of the core, as described in the art disclosed in JP-A 2015-47502, JP-A 2016-112159 and JP-A 2019-5549, is to include water within the base rubber in a core-forming rubber composition.

However, golf balls which use a core having an increased hardness gradient at the interior tend to have a poor durability to impact. In particular, when undispersed contaminant gets mixed into the rubber composition, even if inadvertently, during core production, the contaminant becomes incorporated into the molded and vulcanized core, sometimes triggering premature failure of the core. In such cases, even when the amount of such contaminant within the rubber composition is small, it has unexpectedly triggered premature failure. Such contaminant is often an aggregated solid of various compounding ingredients used when preparing the core-forming rubber composition, such as zinc oxide and zinc stearate, or a ground-up material thereof.

For this reason, to avoid an inferior durability to impact in golf balls, limitations have been imposed on the degree to which the hardness gradient at the core interior is increased in order to improve the distance of the ball. Accordingly, there exists a desire to obtain golf balls in which the spin rate can be sufficiently lowered by increasing the hardness gradient at the core interior and which, by preventing premature failure of the core, have an excellent durability to impact.

SUMMARY OF THE INVENTION

It is therefore an object of the present invention to provide a golf ball in which the hardness difference in the internal hardness profile of the core has been made large, causing the ball to exhibit low spin characteristics when hit and thus giving the ball an improved flight performance, and which moreover is able to maintain a good durability to impact.

As a result of intensive investigations, I have made the following discovery regarding the compounding ingredients of a core-forming rubber composition in a golf ball having a core and a cover of one or more layers. Namely, in a rubber composition containing (a) a base rubber, (b) an α,β-unsaturated carboxylic acid and/or a metal salt thereof as a co-crosslinking agent, (c) an organic peroxide and (d) water, by making the compounding ratio (molar ratio) between component (b) and component (c) larger than in the prior art, specifically, by preparing the rubber composition such that E, defined by the formula $$E = \text{molar amount of component } (b)/\text{molar amount of active oxygens in component } (c),$$

has a value of 70 or more, the hardness difference in the core interior hardness profile is set so as to be large while maintaining the desired core hardness (amount of compressive deformation), enabling the golf ball to fully exhibit low spin characteristics when struck, and also making it possible to improve the durability of the ball to impact even when contaminant has been inadvertently incorporated into the core. The reasons for this, although not entirely clear, are thought to be as follows.

Generally, regarding the influence of an organic peroxide in a butadiene rubber (BR)/zinc acrylate (ZDA) rubber composition, of the radical reactions, BR-ZDA grafting reactions arise preferentially to BR-BR crosslinking reactions. Therefore, when the concentration of organic peroxide is low, it is possible to selectively produce a "highly-grafted/low-crosslinked" rubber. Also, in the course of the polymerization of a BR-ZDA graft polymer, it is likely that ZDA nanoparticles (primary particles) having a size of several nanometers (nm) differing from the size of the charged ZDA monomer particles form within the BR, that these primary particles aggregate to form secondary particles having a size of several tens of nanometers, and that the secondary particles in turn couple with one another to form a network structure. Hence, in the above "highly-grafted/low-crosslinked" rubber structure, the rubber segments presumably elongate during high extension on account of the low degree of crosslinkage and the nanoparticle network grafted to the BR presumably reinforces the structure, resulting in a high strength.

Accordingly, the invention provides a golf ball having a core and a cover of one or more layer, wherein the core is a product molded under heat from a rubber composition which includes (a) a base rubber, (b) a co-crosslinking agent which is an α,β-unsaturated carboxylic acid or a metal salt thereof or both, (c) an organic peroxide and (d) water. Component (d) is included in an amount of from 0.1 to 10 parts by weight per 100 parts by weight of component (a), and components (b) and (c) are included in relative amounts such that E, defined by the formula $$E = \text{molar amount of component } (b)/\text{molar amount of active oxygens in component } (c),$$

has a value of 70 or more. The core has a deformation when compressed under a load of 1,275 N (130 kgf) from an initial load state of 98 N (10 kgf) of not more than 3.5 mm, and the core has a center and a surface with a hardness difference therebetween on the JIS-C hardness scale of 16 or more.

In a preferred embodiment of the golf ball of the invention, the value of E is 80 or more.

In another preferred embodiment of the inventive golf ball, component (d) is included in an amount of from 0.1 to 5 parts by weight per 100 parts by weight of component (a).

In yet another preferred embodiment, the base rubber serving as component (a) is a polybutadiene synthesized using a rare earth catalyst.

In still another preferred embodiment, the rubber composition of the core further includes (e) sulfur or an organosulfur compound. Component (e) may be an organosulfur compound selected from the group consisting of thiols and alkylphenol disulfide polymers.

In a further embodiment of the invention, the rubber composition of the core additionally includes (f) a hindered phenol or a benzimidazole of the general formula below and/or a metal salt thereof

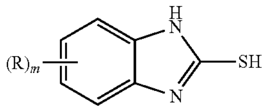

(1)

(wherein R is a hydrogen atom or a hydrocarbon group of 1 to 20 carbon atoms, and m is an integer from 1 to 4, with the proviso that when m is 2 or more, the occurrences of R may be the same or may mutually differ).

In a still further embodiment, the core has a compressive deformation of 3.2 mm or less.

In a yet further embodiment, the hardness difference between the center and surface of the core, expressed on the JIS-C hardness scale, is 20 or more.

Advantageous Effects of the Invention

In the golf ball of the invention, because the core has a distinctive crosslinked rubber structure that is highly grafted and low-crosslinked, the golf ball exhibits low spin characteristics at impact, enabling the flight performance to be improved. Also, even when a contaminant is inadvertently incorporated into the core, premature cracking can be prevented, enhancing the durability of the ball to impact.

DETAILED DESCRIPTION OF THE INVENTION

Figure 1:
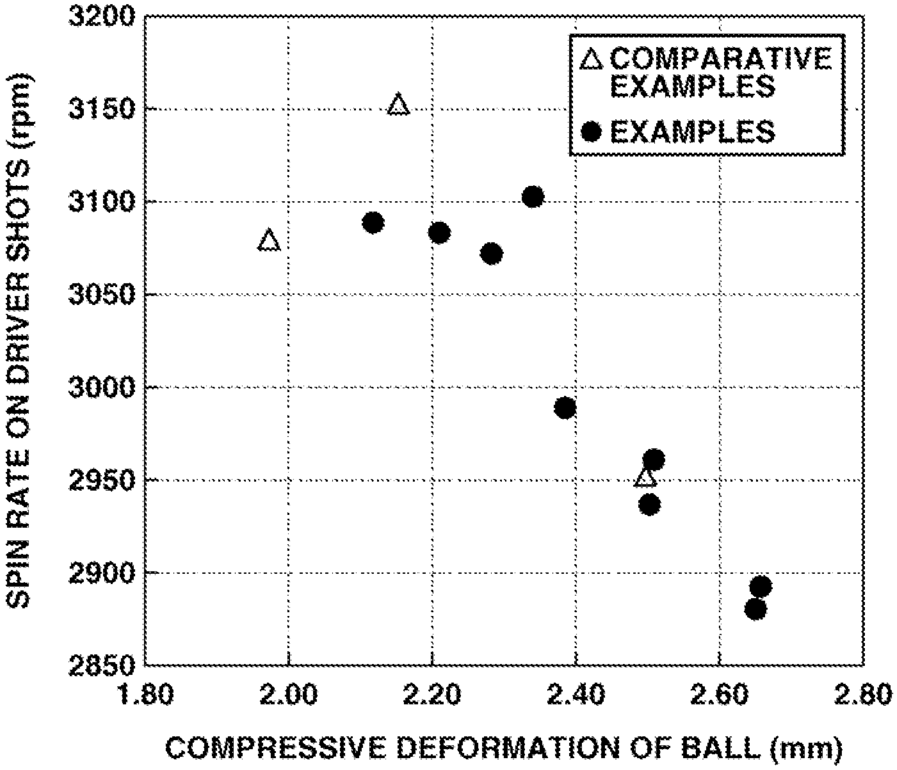
FIG. 1 is a graph showing the relationship between the compressive deformation of the golf balls in the Examples and Comparative Examples and the spin rate of the balls on shots with a driver (W #1).

The objects, features and advantages of the invention will become more apparent from the following detailed description taken in conjunction with the appended diagrams.

The golf ball of the invention has a core and a cover of one or more layer. The core used in this invention is a product molded under heat from a rubber composition which includes components (a) to (d) below as essential ingredients:

(a) a base rubber, (b) a co-crosslinking agent which is an α,β-unsaturated carboxylic acid and/or a metal salt thereof, (c) an organic peroxide, and (d) water.

The base rubber serving as component (a) is not particularly limited, although it is especially suitable to use a polybutadiene.

It is desirable for the polybutadiene to have on the polymer chain thereof a cis-1,4 bond content of 60% or more, preferably 80% or more, more preferably 90% or more, and most preferably 95% or more. When cis-1,4 bonds account for too few of the bonds on the polybutadiene molecule, the resilience may decrease.

The content of 1,2-vinyl bonds on the polybutadiene is generally not more than 2%, preferably not more than 1.7%, and more preferably not more than 1.5%, of the polymer chain. When the content of 1,2-vinyl bonds is too high, the resilience may decrease.

The polybutadiene has a Mooney viscosity ($ML_{1+4}$ (100° C.)) of preferably at least 20, and more preferably at least 30. The upper limit is preferably not more than 120, more preferably not more than 100, and even more preferably not more than 80.

The term “Mooney viscosity” used herein refers to an industrial indicator of viscosity (JIS K 6300) measured with a Mooney viscometer, which is a type of rotary plastometer. This value is represented by the unit symbol $ML_{1+4}$ (100° C.), wherein “M” stands for Mooney viscosity, “L” stands for large rotor (L-type) and “1+4” stands for a pre-heating time of 1 minute and a rotor rotation time of 4 minutes. The “100° C.” indicates that measurement was carried out at a temperature of 100° C.

The polybutadiene used may be one synthesized with a lanthanide rare-earth catalyst or a group VIII metal compound catalyst.

A polybutadiene rubber synthesized with a catalyst differing from the above lanthanide rare-earth catalyst may be included in the base rubber. In addition, styrene-butadiene rubber (SBR), natural rubber, polyisoprene rubber, ethylene-propylene-diene rubber (EPDM) or the like may also be included. These may be used singly or two or more may be used in combination.

The polybutadiene accounts for a proportion of the overall rubber that is preferably 60 wt % or more, more preferably 70 wt % or more, and most preferably 90 wt % or more. The above polybutadiene may account for 100 wt % of the base rubber; that is, it may account for all of the base rubber.

Component (b) is a co-crosslinking agent which is an α,β-unsaturated carboxylic acid and/or a metal salt thereof. The number of carbon atoms on this unsaturated carboxylic acid is preferably from 3 to 8. Specific examples include unsaturated carboxylic acids such as acrylic acid, methacrylic acid, maleic acid and fumaric acid. Specific examples of the metal in the metal salts of these unsaturated carboxylic acids include zinc, sodium, magnesium, calcium and aluminum, with zinc being especially preferred. The co-crosslinking agent is most preferably zinc acrylate.

Component (c) is an organic peroxide. It is preferable for this organic peroxide to be one having a one minute half-life temperature of between 110 and 185° C. Examples of such organic peroxides include dicumyl peroxide (Percumyl D, from NOF Corporation), 2,5-dimethyl-2,5-di(t-butylperoxy)hexane (Perhexa 25B, from NOF Corporation) and di(2-t-butylperoxyisopropyl)benzene (Perbutyl P, from NOF Corporation). The use of dicumyl peroxide is preferred. Other commercial products include Perhexa C-40, Niper BW and Peroyl L (all from NOF Corporation), and Luperco 231XL (from AtoChem Co.). These may be used singly or two or more may be used together.

In this invention, to achieve a crosslinked rubber structure that is highly grafted and low-crosslinked, components (b) and (c) are included in relative amounts such that E, defined by the formula $$E = \text{molar amount of component } (b)/\text{molar amount of active oxygens on component } (c),$$

has a value of 70 or more. Specifically, it is preferable for the co-crosslinking agent serving as component (b) to be included in an amount of from 30 to 50 parts by weight, for the organic peroxide serving as component (c) to be included in an amount of from 0.05 to 0.80 part by weight, and for E to have a value in the above-indicated range. The value of E must be 70 or more, and is preferably 80 or more, and more preferably 90 or more. However, if the co-crosslinking agent is included in an amount that is too high or the organic peroxide is included in an amount that is too low, the desired crosslinked structure may not be attainable and it may be impossible to achieve the lower spin rate that results from increasing the hardness gradient at the core interior. Hence, the value of E has an upper limit of preferably not more than 1,400, and more preferably not more than 1,000.

The molar amounts of components (b) and (c) which are used to calculate the E value refer to the molar amounts determined from the effective weight of the co-crosslinking agent serving as component (b) and the effective weight of component (c). The molar amount of active oxygens on component (c) refers to the molar amount obtained by multiplying the molar amount of the organic peroxide serving as component (c) by the number of peroxide bonds (—O—O-bonds) on that organic peroxide. This number of peroxide bonds (—O—O-bonds) generally has the same meaning as, when selecting the organic peroxide, the "number of peroxide bonds" within the formula shown below for the theoretical amount of active oxygens. That is, the theoretical amount of active oxygens in 100% pure organic peroxide is expressed for each organic peroxide as the percentage obtained by dividing the atomic weight of the active oxygens by the molecular weight of the organic peroxide; it serves as an indicator of the number of free radicals and expresses the concentration or purity of the product.

$$\text{theoretical amount of active oxygens (\%)} = \frac{\text{number of peroxide bonds} \times 16}{\text{molecular weight}}$$

Component (d) is water. The water serving as component (d) is not particularly limited, and may be distilled water or tap water. The use of distilled water which is free of impurities is especially preferred.

The amount of component (d) included per 100 parts by weight of the base rubber is preferably at least 0.1 part by weight, and more preferably at least 0.3 part by weight. The upper limit is preferably not more than 10 parts by weight, more preferably not more than 5 parts by weight, and even more preferably not more than 3 parts by weight. When too much component (d) is included, the hardness decreases and it may not be possible to obtain the desired feel on impact, durability and rebound. When too little component (d) is included, the desired core hardness profile may not be obtained and it may not be possible to fully achieve a ball spin rate-lowering effect on shots.

The rubber composition of the invention may additionally include, as component (e), sulfur or an organosulfur compound.

A commercial product may be used as the sulfur. Examples of such products that may be used include Sulfax-5 from Tsurumi Chemical Industry Co., Ltd., Sanmix S-80N and Sanmix IS-60N from Sanshin Chemical Industry Co., Ltd., and AKROFORM S-80/EPR/P from Akrochem. To increase the dispersibility of a very small amount of sulfur, it is desirable to use the sulfur in the form of a masterbatch. Examples of such sulfur masterbatches include those available under the aforementioned trade names Sanmix S-80N. Sanmix IS-60N and AKROFORM S-80/EPR/P.

The amount of sulfur included per 100 parts by weight of the rubber component, although not particularly limited, is preferably 0.01 part by weight or more, more preferably 0.03 part by weight or more, and most preferably 0.05 part by weight or more. The upper limit is preferably not more than 5.0 parts by weight, more preferably not more than 2.0 parts by weight, and most preferably not more than 1.0 part by weight. When the sulfur content is too high, crosslinking reactions by the organic peroxide are inhibited due to the influence of the sulfur, and so the overall hardness of the molded product tends to diminish considerably. On the other hand, when the sulfur content is too low, it may not be possible within the core interior hardness profile to achieve a large hardness difference between the core surface and the core center.

The organosulfur compound is not particularly limited. Examples include thiophenols, thionaphthols, diphenylpolysulfides, halogenated thiophenols, and metal salts of these. Specific examples include the zinc salts of pentachlorothiophenol, pentafluorothiophenol, pentabromothiophenol and p-chlorothiophenol, and any of the following having 2 to 4 sulfur atoms: diphenylpolysulfides, dibenzylpolysulfides, dibenzoylpolysulfides, dibenzothiazoylpolysulfides, dithiobenzoylpolysulfides and 2-thionaphthols. These may be used singly or two or more may be used together. Of these, preferred use can be made of the zinc salt of pentachlorothiophenol and/or diphenyldisulfide.

It is recommended that the amount of the organosulfur compound included per 100 parts by weight of the base rubber be preferably at least 0.05 part by weight, more preferably at least 0.1 part by weight, and even more preferably at least 0.2 part by weight, and that the upper limit be preferably not more than 3 parts by weight, more preferably not more than 2 parts by weight, and even more preferably not more than 1 part by weight. Including too much organosulfur compound may result in a vulcanizate of the rubber composition that has too low a hardness. On the other hand, including too little may make a rebound-improving effect unlikely.

In addition to the above thiols, alkylphenol disulfide polymers of the following chemical structure may also be used as the organosulfur compound.

(2)

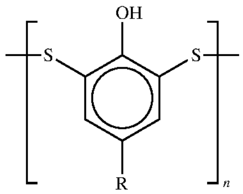

In formula (2), R is an alkyl group, and n is a degree of polymerization within the range of 2 to 20. The alkyl group represented by R is preferably a lower alkyl group of 1 to 6 carbon atoms. Specific examples include methyl, ethyl, n-propyl, iso-propyl, n-butyl, tert-butyl, n-amyl (pentyl), iso-amyl (pentyl), tert-amyl (pentyl), sec-isoamyl, neopentyl, n-hexyl, iso-hexyl and tert-hexyl groups. The alkylphenol disulfide polymer is more preferably an amylphenol disulfide polymer, specific examples of which include the commercial products Sanceler AP (available from Sanshin Chemical Industry Co., Ltd.) and Vultac5 (Arkema K.K.).

The amount of this alkylphenol disulfide polymer included per 100 parts by weight of the rubber component is not particularly limited, but is preferably 0.05 part by weight or more, more preferably 0.1 part by weight or more, and most preferably 0.3 part by weight or more. The upper limit is preferably not more than 5.0 parts by weight, more preferably not more than 3.0 parts by weight, and most preferably not more than 2.0 parts by weight. When too much is included, crosslinking reactions by the organic peroxide are inhibited due to the influence of the sulfur, and so the overall hardness of the molded product tends to decrease considerably.

The rubber composition of the invention may additionally include an antioxidant as component (f). Specific examples include hindered phenol antioxidants such as 2,6-di-tert-butyl-4-methylphenol, 2,6-di-tert-butyl-4-ethylphenol, 2,2'-methylenebis(4-methyl-6-tert-butylphenol), pentaerythritol tetrakis[3-(3,5-di-tert-butyl-4-hydroxyphenyl)propionate] and 1,3,5-tris(3',5'-di-t-butyl-4-hydroxybenzyl) isocyanuric acid. Examples of commercial products that may be used include Nocrac 200, Nocrac M-17 and Nocrac NS-6 (Ouchi Shinko Chemical Industry Co., Ltd.), IRGANOX 1010 (from BASF), and ADK STAB AO-20 (from Adeka Corporation). These may be used singly or two or more may be used together. The amount of such antioxidant included per 100 parts by weight of the base rubber is not particularly limited, but is preferably 0.05 part by weight or more, and more preferably 0.1 part by weight or more. The upper limit is preferably not more than 3.0 parts by weight, more preferably not more than 2.0 parts by weight, and still more preferably not more than 1.5 parts by weight. When the content is too high or too low, a suitable core hardness gradient may not be obtained, and so a suitable rebound, durability and spin rate lowering effect on full shots may not be attainable.

Alternatively, a benzimidazole of the general formula shown below and/or a metal salt thereof may be used as the antioxidant (f).

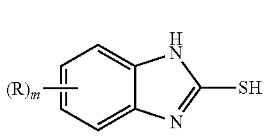

(1)

R in formula (1) is a hydrogen atom or a hydrocarbon group of 1 to 20 carbon atoms. Also, m is an integer from 1 to 4; when m is 2 or more, the occurrences of R may be the same or may mutually differ. Specific examples of benzimidazoles of formula (1) include 2-mercaptobenzimidazole, 2-mercaptomethylbenzimidazole, and metal salts of these. Zinc salts are suitable as the metal salts.

Aside from above-described components (a) to (f), various additives such as fillers and processing aids may be included in the inventive rubber composition, provided that doing so does not detract from the advantageous effects of the invention.

Examples of fillers that may be suitably used include zinc oxide, barium sulfate and calcium carbonate. These may be used singly or two or more may be used together. The amount of filler included per 100 parts by weight of the base rubber may be set to preferably at least 1 part by weight, more preferably at least 3 parts by weight, and even more preferably at least 5 parts by weight. The upper limit in the amount of filler included per 100 parts by weight of the base rubber may be set to preferably not more than 100 parts by weight, more preferably not more than 60 parts by weight, and even more preferably not more than 40 parts by weight. When too much or too little filler is included, it may not be possible to obtain a proper weight and a suitable rebound.

Processing aids that may be suitably used include higher fatty acids and metal salts thereof. Examples of higher fatty acids include stearic acid, palmitic acid, oleic acid, linoleic acid, linolenic acid and myristic acid. Stearic acid is especially preferred. Examples of higher fatty acid metal salts include lithium salts, sodium salts, potassium salts, copper salts, magnesium salts, calcium salts, strontium salts, barium salts, tin salts, cobalt salts, nickel salts, zinc salts and aluminum salts. The use of zinc stearate is especially preferred. The amount of processing aid included per 100 parts by weight of the base rubber may be set to preferably at least 1 part by weight, more preferably at least 3 parts by weight, and even more preferably at least 5 parts by weight. The upper limit in the amount included per 100 parts by weight of the base rubber may be set to preferably not more than 20 parts by weight, more preferably not more than 15 parts by weight, and even more preferably not more than 10 parts by weight. When too much is included, a sufficient hardness and rebound may not be obtained; when too little is included, the chemicals that are added may not fully disperse and it may not be possible to obtain the expected properties. Examples of methods that may be used to add the processing aid include, but are not particularly limited to: charging the processing aid into a mixer at the same time as the other chemicals, adding the processing aid after first mixing it together with other chemicals such as component (b), adding the processing aid by coating it onto the surface of another chemical such as component (b) or as a binder for that chemical, and adding the processing aid after first preparing a masterbatch of it together with component (a).

A vulcanizate can be produced by vulcanizing/curing the above rubber composition. For example, the core which is a vulcanizate can be produced by using a mixing apparatus such as a Banbury mixer or a roll mill to knead the rubber composition, using a core mold to compression mold or injection mold the kneaded composition, and then curing the molded body by suitably heating it under conditions sufficient to allow the organic peroxide or co-crosslinking agent to act, such as at a temperature of between 100 and 200° ° C. for 10 to 40 minutes.

The core obtained after vulcanizing/curing the above composition can have a hardness gradient with a large hardness difference between the surface and the center thereof, making it possible to increase the durability of the golf ball while maintaining a good spin performance.

The core has a center hardness on the JIS-C hardness scale which, although not particularly limited, is preferably at least 40, more preferably at least 45, and even more preferably at least 50. The center hardness is preferably not more than 75, more preferably not more than 70, and even more preferably not more than 65. At a core center hardness outside of the above range, the feel of the ball at impact may worsen or the durability may decrease and a spin rate lowering effect may not be attainable.

The core has a surface hardness on the JIS-C hardness scale which, although not particularly limited, is preferably at least 65, more preferably at least 70, and even more preferably at least 72. The surface hardness is preferably not more than 95, more preferably not more than 90, and even more preferably not more than 88. At a core surface hardness lower than the above range, the rebound may decrease and a sufficient distance may not be attained. When the core surface hardness is higher than the above range, the feel at impact may become too hard or the durability to cracking on repeated impact may worsen.

The core has a hardness profile in which the hardness difference between the core surface and the core center is sufficiently large. Specifically, the hardness difference A-B between the core surface hardness (A) and the core center hardness (B), expressed on the JIS-C hardness scale, is 16 or more, preferably 19 or more, more preferably 20 or more, and even more preferably 25 or more. The hardness difference is preferably not more than 50, more preferably not more than 45, and even more preferably not more than 40. When this hardness difference value is too small, the spin rate lowering effect on W #1 shots may be inadequate, as a result of which a good distance may not be obtained. On the other hand, when this hardness difference value is too large, the initial velocity of the golf ball when struck may become low, as a result of which a good distance may not be obtained, or the durability to cracking on repeated impact may worsen. Here, "center hardness" refers to the hardness measured at the center of the cross-section obtained by cutting the core in half through the center, and "surface hardness" refers to the hardness measured at the spherical surface of the core. "JIS-C hardness" refers to the hardness measured with a spring-type durometer (JIS-C model) as specified in JIS K 6301-1975.

The core hardness gradient used in this invention is preferably one in which the hardness remains the same or increases, but does not decrease, from the center toward the surface of the core.

It is critical for the core (a product molded under heat) to have a compressive hardness (deformation) when compressed under a final load of 1,275 N (130 kgf) from an initial load state of 98 N (10 kgf) which is 3.5 mm or less; the compressive hardness is preferably 3.2 mm or less, and more preferably 3.0 mm or less. Although the compressive hardness has no particular lower limit, this value is preferably 2.0 mm or more, more preferably 2.3 mm or more, and even more preferably 2.5 mm or more. When this value is too large, the core becomes too soft, as a result of which a sufficient spin rate-lowering effect may not be obtained and the resilience may decrease. When this value is too small, a spin rate-lowering effect may not be obtained and the feel of the ball at impact may become hard.

The core has a diameter which is not particularly limited and depends also on the layer structure of the golf ball to be manufactured. The core diameter is preferably at least 30 mm, and more preferably at least 35 mm, but is preferably not more than 41 mm, and more preferably not more than 40 mm. At a core diameter outside of this range, the initial velocity of the ball may decrease or a suitable spin performance may not be obtained.

Next, the cover of one or more layer encasing the core is described.

The cover material is not particularly limited; use can be made of a known material such as various types of ionomer resins and thermoplastic polyurethane elastomers that are used in golf balls.

To achieve an even further spin rate-lowering effect, it is especially desirable to use a highly neutralized ionomeric material in the layer adjoining the core. Specifically, it is preferable to use a material obtained by blending components (i) to (iv) below:

100 parts by weight of a resin component composed of, in admixture, (i) a base resin of (i-1) an olefin-unsaturated carboxylic acid random copolymer and/or a metal ion neutralization product of an olefin-unsaturated carboxylic acid random copolymer mixed with (i-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio between 100:0 and 0:100, and (ii) a non-ionomeric thermoplastic elastomer in a weight ratio between 100:0 and 50:50;

(iii) from 5 to 80 parts by weight of a fatty acid and/or fatty acid derivative having a molecular weight of from 228 to 1,500; and (iv) from 0.1 to 17 parts by weight of a basic inorganic metal compound capable of neutralizing un-neutralized acid groups in components (i) and (iii).

In particular, when using a mixed material of components (i) to (iv), it is preferable to utilize one in which at least 70% of the acid groups are neutralized.

The material making up the outermost layer of the cover is preferably composed primarily of a urethane material, especially a thermoplastic urethane elastomer.

In addition, one or more intermediate layer may be formed between the layer adjoining the core and the outermost cover layer. In this case, it is preferable for a thermoplastic resin such as an ionomer to be used as the intermediate layer material.

To obtain the above cover, use may be made of, for example, a method that involves placing within a mold a single-layer core or a multilayer core of two or more layers that has been prefabricated according to the type of ball, mixing and melting the above mixture under applied heat, and injection-molding the molten mixture over the core so as to encase the core with the desired cover. In this way, production of the cover can be carried out in a state where excellent thermal stability, flowability and processability are assured. As a result, the golf ball ultimately obtained has a high rebound, and moreover has a good feel at impact and an excellent scuff resistance. Alternatively, use may be made of a cover-forming method other than the foregoing, such as one in which, for example, a pair of hemispherical half-cups are molded beforehand from the cover material, following which the core is enclosed within the half-cups and molding is carried out under applied pressure at between 120° C. and 170° C. for a period of 1 to 5 minutes.

When the cover is made of a single layer, the thickness thereof may be set to from 0.3 to 3 mm. When the cover is made of two layers, the thickness of the outermost layer may be set to from 0.3 to 2.0 mm and the thickness of the inner cover layer (intermediate layer) may be set to from 0.3 to 2.0 mm. The Shore D hardness of each layer making up the cover, although not particularly limited, is set to preferably at least 40, and more preferably at least 45; the upper limit is preferably not more than 70, and more preferably not more than 65.

Numerous dimples are formed on the surface of the outermost layer of the cover. In addition, the cover may be subjected to various types of treatment, such as surface preparation, stamping and painting.

EXAMPLES

Examples according to the invention and Comparative Examples are given below by way of illustration, although the invention is not limited by the following Examples.

Examples 1 to 9, Comparative Examples 1 to 3

Using core materials in which the chief ingredients were the polybutadienes shown in Table 1 below, rubber compositions were prepared according to the rubber formulations for Examples 1 to 9 and Comparative Examples 1 to 3. The compositions were vulcanized for 20 minutes at 158° C. and a core surface abrasion step was carried out, thereby producing cores having a diameter of about 38.6 mm.

TABLE 1

| Rubber formulation | | Example | | | | | |
|---|---|---|---|---|---|---|---|
| (pbw) | | 1 | 2 | 3 | 4 | 5 | 6 |
| (a) | Polybutadiene rubber | 100 | 100 | 100 | 100 | 100 | 100 |
| (b) | Zinc acrylate | 38.5 | 42.5 | 41.5 | 41.5 | 47.5 | 43.0 |
| (c-1) | Organic peroxide (1) | 0.5 | 0.5 | 0.3 | 0.3 | 0.3 | 0.2 |
| (c-2) | Organic peroxide (2) | | | 0.1 | | | 0.1 |
| (d) | Water | 0.4 | 0.8 | 0.8 | 0.4 | 0.8 | 0.8 |
| — | Zinc oxide | 14.5 | 12.9 | 13.1 | 13.2 | 10.8 | 12.4 |
| (e) | Organosulfur compound (1) | 0.3 | 0.3 | 0.6 | 0.3 | 0.3 | 0.6 |
| (e) | Organosulfur compound (2) | | | | | | |
| (f) | Antioxidant (1) | 0.1 | 0.1 | 0.1 | 0.1 | 0.1 | 0.1 |
| (f) | Antioxidant (2) | | | | | | |
| — | Artificial contaminant | 1 | 1 | 1 | 1 | 1 | 1 |
| Effective weight of component (b) | | 32.7 | 36.1 | 35.3 | 35.3 | 40.4 | 36.6 |
| Molar amount of component (b) | | 0.158 | 0.174 | 0.170 | 0.170 | 0.195 | 0.176 |
| Molar amount of component (c-1) | | 0.00185 | 0.00185 | 0.00111 | 0.00111 | 0.00111 | 0.00074 |
| Molar amount of component (c-2) | | | | 0.00015 | | | 0.00015 |
| Molar amount of component (c) (total) | | 0.00185 | 0.00185 | 0.00126 | 0.00111 | 0.00111 | 0.00089 |
| Molar amount of active oxygens in component (c) | | 0.00185 | 0.00185 | 0.00142 | 0.00111 | 0.00111 | 0.00105 |
| Molar amount of component (b)/ molar amount of active oxygens in component (c) | | 85.4 | 94.1 | 120.6 | 153.2 | 175.7 | 169.2 |

| Rubber formulation | | Example | | | Comparative Example | | |
|---|---|---|---|---|---|---|---|
| (pbw) | | 7 | 8 | 9 | 1 | 2 | 3 |
| (a) | Polybutadiene rubber | 100 | 100 | 100 | 100 | 100 | 100 |
| (b) | Zinc acrylate | 51.5 | 40.0 | 48.0 | 37.0 | 43.0 | 46.5 |
| (c-1) | Organic peroxide (1) | 0.1 | 0.3 | 0.3 | 1.0 | 1.0 | 1.0 |
| (c-2) | Organic peroxide (2) | | 0.4 | 0.5 | | | |
| (d) | Water | 0.8 | 0.5 | 0.5 | 0.4 | 0.4 | 0.4 |
| — | Zinc oxide | 8.9 | 12.9 | 9.5 | 15.5 | 13.0 | 11.5 |
| (e) | Organosulfur compound (1) | 0.6 | 1.0 | 1.0 | 0.4 | 0.4 | 0.4 |
| (e) | Organosulfur compound (2) | | 1.0 | 1.0 | | | |
| (f) | Antioxidant (1) | 0.1 | 0.1 | 0.1 | 0.1 | 0.1 | 0.1 |
| (f) | Antioxidant (2) | | 0.3 | 0.3 | | | |
| — | Artificial contaminant | 1 | 1 | 1 | 1 | 1 | 1 |
| Effective weight of component (b) | | 43.8 | 34.0 | 40.8 | 31.5 | 36.6 | 39.5 |

TABLE 1-continued

| | | | | | | |
|---|---|---|---|---|---|---|
| Molar amount of component (b) | 0.211 | 0.164 | 0.197 | 0.152 | 0.176 | 0.190 |
| Molar amount of component (c-1) | 0.00037 | 0.00111 | 0.00111 | 0.00370 | 0.00370 | 0.00370 |
| Molar amount of component (c-2) | | 0.00061 | 0.00077 | | | |
| Molar amount of component (c) (total) | 0.00037 | 0.00172 | 0.00188 | 0.0037 | 0.0037 | 0.0037 |
| Molar amount of active oxygens in component (c) | 0.00037 | 0.00234 | 0.00265 | 0.0037 | 0.0037 | 0.0037 |
| Molar amount of component (b)/ molar amount of active oxygens in component (c) | 570.3 | 70.4 | 74.3 | 41.1 | 47.6 | 51.4 |

Details on the above ingredients are given below.

- Polybutadiene rubber: Available under the trade name "BR700" (ENEOS Corporation, high-cis polybutadiene rubber/Nd catalyst polymerization)
- Zinc acrylate: Available under the trade name "ZN-DA85S" (Nippon Shokubai Co., Ltd.)
- Organic Peroxide (1): Dicumyl peroxide, available under the trade name "Percumyl D" (NOF Corporation; 100% purity)
- Organic Peroxide (2): Mixture of 1,1-di(t-butylperoxy) cyclohexane and silica, available under the trade name "Perhexa C-40" (NOF Corporation; 40% purity)
- Water: Distilled water
- Zinc oxide: Available as "Zinc Oxide Grade 3" (Sakai Chemical Co., Ltd.)
- Organosulfur Compound (1): Zinc salt of pentachlorothiophenol, available from FUJIFILM Wako Pure Chemical Corporation
- Organosulfur Compound (2): Amylphenol disulfide polymer, available as "SANCELER AP" from Sanshin Chemical Industry Co., Ltd.
- Antioxidant (1): Available under the trade name "Nocrac NS-6" (a hindered phenol antioxidant from Ouchi Shinko Chemical Industry Co., Ltd.)
- Antioxidant (2): Available under the trade name "Nocrac MB" (a benzimidazole antioxidant from Ouchi Shinko Chemical Industry Co., Ltd.)

Method of Calculating Molar Amount of Component (b)/Molar Amount of Active Oxygens in Component (c)

In each Example, the product available under the trade name ZN-DA85S from Nippon Shokubai Co., Ltd. was used as the zinc acrylate serving as component (b). This product is a mixture of 85 wt % zinc acrylate and 15 wt % zinc stearate. For example, in Example 2, the effective weight of component (b) is 42.5×0.85=36.125. From the molecular weight of zinc acrylate (207.5), the molar amount of component (b) becomes 36.125/207.5≈0.174. The molecular weight of dicumyl peroxide, which is the organic peroxide serving as component (c-1), is 270.38 and the purity of this product is 100%; hence, the molar amount of component (c-1) is 0.5/270.38≈0.00185. Because the number of active oxygen bonds in the organic peroxide serving as component (c-1) is 1, the molar amount of these active oxygens is the same as the molar amount of the organic peroxide. Therefore, the value of E in Example 2, expressed as the molar amount of component (b)/molar amount of active oxygens in component (c), is 0.174/0.00185≈94.1.

In Example 3, using a similar method of calculation, the molar amount of component (b) is (41.5×0.85)/207.5=0.17 and the molar amount of the organic peroxide serving as component (c-1) is 0.3/270.38≈0.00111. Example 3 concomitantly uses component (c-2) as the organic peroxide. The product Perhexa C-40 used here has a purity of 40%. This organic peroxide, 1,1-di(t-butylperoxy)cyclohexane, has a molecular weight of 260.38, and the number of active oxygen bonds is 2. Accordingly, the molar amount of active oxygens in component (c-2) is (0.1×0.4)/260.38×2≈0.0003. Hence, the E value in Example 3, expressed as the molar amount of component (b)/molar amount of active oxygens in component (c), is 0.17/(0.00111+0.0003)≈120.6.

Method of Producing Artificial Contaminant in Table 1

Artificial contaminant was incorporated into the rubber composition in each Example, thereby placing the core into a state that is prone to cracking, and the durability to impact was evaluated. Evaluation of the durability to impact is subsequently described.

The artificial contaminant was produced by first mixing together zinc oxide and finely powdered zinc stearate in a weight ratio of 2:1, heating the mixture in an oven at 150° C. for 30 minutes, lowering the temperature to room temperature, and then coarsely grinding the resulting heat-solidified matter. The ground product was passed through 1 mm and 0.5 mm sieves, giving an aggregate having a size of from 0.5 to 1.0 mm. This aggregate was added as an artificial contaminant with a roller in the amount indicated in Table 1 (1 phr) to milled rubber formulated as shown in Table 1.

Cross-Sectional Hardnesses of Core

In each of the above Examples and Comparative Examples, the cross-sectional hardnesses at various positions of the core, including the surface and center, were measured by the following methods.

(1) Surface Hardness of Core

The hardnesses at four random points on the core surface were measured at a temperature of 23±1° C. with a JIS-C durometer by perpendicularly setting the indenter of the durometer against the spherical surface of the core. The average value of these measurements was treated as the measured value for one core, and the average value for three measured cores was determined. The measured values are presented in Table 3.

(2) Cross-Sectional Hardnesses of Core

The core was cut through the center to obtain a flat cross-sectional plane. The hardnesses at the center of the hemispherical core and at positions located every 2 mm from the center toward the surface of the core were measured at a temperature of 23±1° C. with a JIS-C durometer by perpendicularly setting the indenter of the durometer against the flat cross-section, thereby obtaining the measured value for one core. At each position, the average value for three measured cores was determined. The measured values are presented in Table 3.

Compressive Hardnesses of Core and Ball

The compressive hardnesses (amount of deformation) of the core and ball in millimeters when compressed at a speed of 10 mm/s under a final load of 1,275 N (130 kgf) from an initial load of 90 N (10 kgf) were measured at a temperature of 23±1° C. In each case, the average value for ten measured balls was determined.

Formation of Cover Layers (Intermediate Layer and Outermost Layer)

Using an injection mold, the intermediate layer material shown in Table 2 (ionomeric resin material) was then injection-molded over the surface of the core, forming an intermediate layer having a thickness of about 1.2 mm and a Shore D hardness of 64. Next, using a different injection mold, the outermost layer material shown in Table 2 (urethane resin material) was injection-molded over the resulting intermediate layer-encased sphere, forming an outermost layer having a thickness of about 0.8 mm and a Shore D hardness of 40.

TABLE 2

| Compounding ingredients (pbw) | Intermediate layer | Outermost layer |
|---|---|---|
| Himilan 1706 | 35 | |
| Himilan 1557 | 15 | |
| Himilan 1605 | 50 | |
| TPU | | 100 |
| Polyethylene wax | | 1.0 |

TABLE 2-continued

| Compounding ingredients (pbw) | Intermediate layer | Outermost layer |
|---|---|---|
| Isocyanate compound | | 6.3 |
| Titanium oxide | | 3.3 |
| Trimethylolpropane | 1.1 | |

Details on the compounding ingredients in the above table are given below. Himilan® 1706, Himilan® 1557, Himilan® 1605: Ionomer resins available from Dow-Mitsui Polychemicals Co., Ltd.

TPU: An ether-type thermoplastic polyurethane available as Pandex® from DIC Covestro Polymer, Ltd.; Shore D hardness, 40

Polyethylene wax: Available under the trade name Sanwax 161P from Sanyo Chemical Industries, Ltd.

Isocyanate compound: 4,4'-Diphenylmethane diisocyanate

The spin rate of each of the resulting golf balls on shots with a driver was evaluated by the method described below. The results are shown in Table 3.

Spin Rate on Driver Shots

The spin rate of the ball immediately after being struck at a head speed of 45 m/s with a driver (W #1) mounted on a golf swing robot was measured with a launch monitor. The club used was the TourB XD-3 Driver (2016 model; loft angle,)9.5° manufactured by Bridgestone Sports Co., Ltd. The spin rate is shown in Table 3. In addition, FIG. 1 shows a graph of the relationship between the compressive deformation of the golf ball in each Example and Comparative Example versus the spin rate of the ball on shots with a driver (W #1).

Durability to Impact

Figure 2:
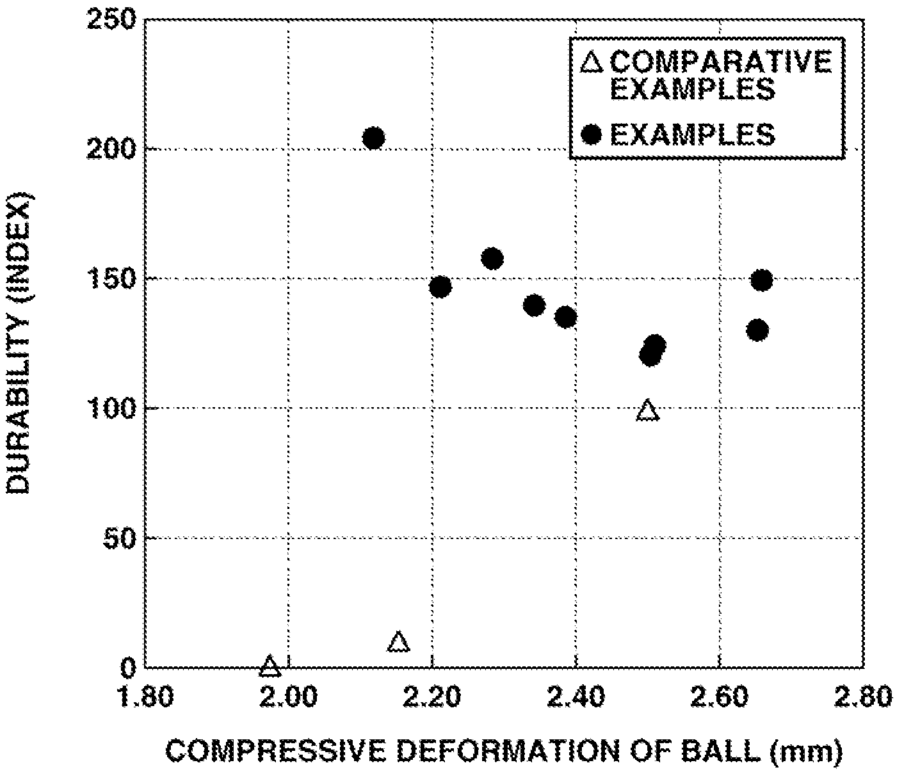
FIG. 2 is a graph showing the relationship between the compressive deformation of the golf balls in the Examples and Comparative Examples and the durability of the balls to impact.

The durability of the golf ball was evaluated using an ADC Ball COR Durability Tester manufactured by Automated Design Corporation (U.S.). This tester fires a golf ball pneumatically, causing it to consecutively strike two metal plates arranged in parallel. The incident velocity against the metal plates was set to 43 m/s. The number of shots required for the golf ball to crack was measured, and the average value of the measurements taken for ten golf balls was calculated. Durability indices for the balls in the respective Examples were determined relative to a reference value of 100 for the average number of shots required for the ball obtained in Comparative Example 1 to crack and are shown in Table 3. In addition, FIG. 2 shows a graph of the relationship between the compressive deformation of the golf ball in each Example and Comparative Example versus the durability of the ball to impact.

TABLE 3

| | | Example | | | | | |
|---|---|---|---|---|---|---|---|
| | | 1 | 2 | 3 | 4 | 5 | 6 |
| Core (after abrasion) | Diameter (mm) | 38.64 | 38.64 | 38.63 | 38.64 | 38.64 | 38.62 |
| | Weight (g) | 34.85 | 34.78 | 34.80 | 34.75 | 34.79 | 34.71 |
| | Compressive deformation (mm) | 2.90 | 3.06 | 3.15 | 2.78 | 2.78 | 3.14 |
| Core hardness profile (JIS-C) | Center hardness (B) | 66.5 | 64.1 | 66.2 | 68.2 | 68.2 | 57.3 |
| | Hardness 2 mm from center | 67.0 | 65.6 | 66.3 | 68.6 | 68.4 | 60.0 |
| | Hardness 4 mm from center | 69.4 | 68.8 | 67.3 | 69.9 | 70.0 | 64.7 |
| | Hardness 6 mm from center | 71.1 | 70.6 | 68.4 | 71.1 | 71.2 | 66.8 |

TABLE 3-continued

| | | | | | | | |
|---|---|---|---|---|---|---|---|
| | Hardness 8 mm from center | 72.1 | 71.4 | 68.9 | 71.6 | 71.8 | 67.9 |
| | Hardness 10 mm from center | 72.3 | 71.3 | 68.8 | 71.8 | 71.7 | 67.9 |
| | Hardness 12 mm from center | 72.3 | 71.0 | 70.8 | 72.5 | 71.5 | 69.7 |
| | Hardness 14 mm from center | 76.2 | 73.8 | 78.4 | 77.8 | 74.6 | 77.9 |
| | Hardness 16 mm from center | 82.7 | 83.5 | 81.4 | 82.3 | 84.0 | 81.3 |
| | Hardness 18 mm from center | 84.0 | 85.2 | 81.5 | 82.8 | 85.9 | 81.7 |
| | Surface hardness (A) | 87.2 | 89.3 | 84.5 | 86.0 | 89.2 | 84.1 |
| | Hardness difference (A − B) | 20.7 | 25.2 | 18.3 | 17.8 | 21.0 | 26.8 |
| Intermediate layer | Diameter (mm) | 41.01 | 41.03 | 41.03 | 41.03 | 41.02 | 41.03 |
| Ball | Diameter (mm) | 42.70 | 42.69 | 42.69 | 42.70 | 42.68 | 42.69 |
| | Weight (g) | 45.43 | 45.37 | 45.38 | 45.31 | 45.36 | 45.29 |
| | Compressive deformation (mm) | 2.34 | 2.39 | 2.51 | 2.28 | 2.21 | 2.50 |
| Evaluation | Spin rate when struck with W#1 (rpm) | 3,103 | 2,989 | 2,961 | 3,072 | 3,083 | 2,937 |
| | Durability (index) | 139 | 135 | 124 | 158 | 147 | 120 |

| | | Example | | | Comparative Example | | |
|---|---|---|---|---|---|---|---|
| | | 7 | 8 | 9 | 1 | 2 | 3 |
| Core (after abrasion) | Diameter (mm) | 38.69 | 38.63 | 38.66 | 38.66 | 38.64 | 38.64 |
| | Weight (g) | 34.66 | 34.58 | 34.62 | 34.97 | 34.89 | 34.88 |
| | Compressive deformation (mm) | 3.35 | 3.26 | 2.55 | 3.22 | 2.75 | 2.53 |
| Core hardness profile (JIS-C) | Center hardness (B) | 62.3 | 63.2 | 67.8 | 66.0 | 71.8 | 73.0 |
| | Hardness 2 mm from center | 62.8 | 63.4 | 68.1 | 66.5 | 71.8 | 73.3 |
| | Hardness 4 mm from center | 63.5 | 64.8 | 69.8 | 67.9 | 72.7 | 74.3 |
| | Hardness 6 mm from center | 64.3 | 65.8 | 71.2 | 69.2 | 73.5 | 75.1 |
| | Hardness 8 mm from center | 65.1 | 66.2 | 71.6 | 70.3 | 73.9 | 75.3 |
| | Hardness 10 mm from center | 66.7 | 66.8 | 71.4 | 70.6 | 73.7 | 75.0 |
| | Hardness 12 mm from center | 71.7 | 71.5 | 72.7 | 71.1 | 73.4 | 74.5 |
| | Hardness 14 mm from center | 76.0 | 77.4 | 81.8 | 73.6 | 76.3 | 76.5 |
| | Hardness 16 mm from center | 77.0 | 79.5 | 84.6 | 82.1 | 85.0 | 86.0 |
| | Hardness 18 mm from center | 76.9 | 79.2 | 84.1 | 84.5 | 88.3 | 89.8 |
| | Surface hardness (A) | 79.5 | 81.5 | 87.1 | 87.6 | 90.9 | 92.9 |
| | Hardness difference (A − B) | 17.2 | 18.3 | 19.3 | 21.6 | 19.1 | 19.9 |
| Intermediate layer | Diameter (mm) | 41.03 | 41.00 | 41.05 | 41.02 | 41.03 | 41.04 |
| Ball | Diameter (mm) | 42.70 | 42.68 | 42.69 | 42.70 | 42.69 | 42.70 |
| | Weight (g) | 45.24 | 45.16 | 45.16 | 45.51 | 45.49 | 45.50 |
| | Compressive deformation (mm) | 2.66 | 2.65 | 2.12 | 2.50 | 2.15 | 1.97 |
| Evaluation | Spin rate when struck with W#1 (rpm) | 2,892 | 2,881 | 3,089 | 2,953 | 3,153 | 3,080 |
| | Durability (index) | 149 | 130 | 204 | 100 | 11 | 1 |

It is apparent from the results in Table 3 that each of the golf balls in Examples 1 to 9 of the invention had a large core internal hardness difference and, along with maintaining a reduction in the spin rate on driver shots, had an excellent durability at impact.

By contrast, it is apparent from FIG. 2 that the golf balls obtained in Comparative Examples 1 to 3, when compared with the golf balls obtained in the Examples of the invention, had a low durability to impact at the same compressive deformation. In particular, the durability to impact-improving effect in the Examples of the invention was larger at a smaller compressive deformation (that is, at a larger core hardness).

Japanese Patent Application No. 2022-186778 is incorporated herein by reference. Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball comprising a core and a cover of one or more layer, wherein the core is a product molded under heat from a rubber composition which includes:

(a) a base rubber, (b) zinc diacrylate (ZDA) as a co-crosslinking agent, (c) an organic peroxide, and (d) water, component (d) being included in an amount of from 0.1 to 10 parts by weight per 100 parts by weight of component (a) and components (b) and (c) being included in relative amounts such that E, defined by the formula $$E = \text{molar amount of component } (b)/\text{molar amount of active oxygens in component } (c),$$

has a value of 70 or more; the core includes grafted polymers of BR-ZDA in which ZDA nanoparticles agglomerate to become secondary particles and further the secondary particles are connected mutually such that a network structure is formed; the core has a deformation when compressed under a load of 1,275 N (130 kgf) from an initial load state of 98 N (10 kgf) of not more than 3.5 mm; and the core has a center and a surface with a hardness difference therebetween on the JIS-C hardness scale of 16 or more.

2. The golf ball of claim 1, wherein the value of E is 80 or more.

3. The golf ball of claim 1, wherein component (d) is included in an amount of from 0.1 to 5 parts by weight per 100 parts by weight of component (a).

4. The golf ball of claim 1, wherein the base rubber serving as component (a) is a polybutadiene synthesized using a rare earth catalyst.

5. The golf ball of claim 1, wherein the rubber composition of the core further includes:

(e) sulfur or an organosulfur compound.

6. The golf ball of claim 5, wherein component (e) is an organosulfur compound selected from the group consisting of thiols and alkylphenol disulfide polymers.

7. The golf ball of claim 1, wherein the rubber composition of the core further includes:

(f) a hindered phenol or a benzimidazole of the general formula below, a metal salt of the benzimidazole or both the benzimidazole and a metal salt thereof (1)

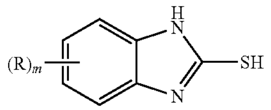

(wherein R is a hydrogen atom or a hydrocarbon group of 1 to 20 carbon atoms, and m is an integer from 1 to 4, with the proviso that when m is 2 or more, the occurrences of R may be the same or may mutually differ).

8. The golf ball of claim 1, wherein the core has a compressive deformation of 3.2 mm or less.

9. The golf ball of claim 1, wherein the hardness difference between the center and surface of the core, expressed on the JIS-C hardness scale, is 20 or more.

10. The golf ball of claim 1, wherein the amount of component (b) is from 38.5 to 51.5 parts by weight per 100 parts by weight of the base rubber (a).

11. The golf ball of claim 1, wherein the amount of component (c) is from 0.05 to 0.80 part by weight per 100 parts by weight of the base rubber (a).

12. The golf ball of claim 6, wherein the component (e) is the alkylphenoldisulfide polymers.

13. The golf ball of claim 12, wherein the alkylphenoldisulfide polymers are amylphenoldisulfide polymers.

* * * * *